United States Patent [19]
Graves

[11] Patent Number: 5,927,901
[45] Date of Patent: Jul. 27, 1999

[54] UNDERWATER PIPELINE APPARATUS FOR DELIVERING A PIG UNIT BY FLOODING OF THE PIPELINE

[75] Inventor: Leslie John Graves, Kincardineshire, United Kingdom

[73] Assignee: Copipe Systems Limited, Aberdeen, United Kingdom

[21] Appl. No.: 08/927,075

[22] Filed: Sep. 11, 1997

[51] Int. Cl.⁶ .................................. F16L 1/00; F16L 1/12
[52] U.S. Cl. .......................... 405/158; 405/171; 138/97; 15/3.5
[58] Field of Search .................................... 405/158, 169, 405/170, 171; 138/44, 45, 90, 97, 98; 15/3.5, 3.51, 104.061, 104.062; 166/153; 254/134.3

[56] References Cited

U.S. PATENT DOCUMENTS

| | | | |
|---|---|---|---|
| 3,496,998 | 2/1970 | Weaver | 166/153 |
| 3,525,401 | 8/1970 | Hanson et al. | 166/153 X |
| 3,788,084 | 1/1974 | Matthews, Jr. | 405/173 |
| 3,890,693 | 6/1975 | Eagleton et al. | 405/158 X |
| 3,903,730 | 9/1975 | Matthews, Jr. et al. | 138/90 X |
| 4,155,669 | 5/1979 | Rochelle | 405/169 X |
| 4,252,465 | 2/1981 | Broussard et al. | 405/158 |
| 4,360,290 | 11/1982 | Ward | 405/170 |
| 4,493,589 | 1/1985 | Ward | 405/171 X |
| 5,139,576 | 8/1992 | Davis | 15/104.062 X |
| 5,184,921 | 2/1993 | Hancock | 405/171 X |

FOREIGN PATENT DOCUMENTS 2303895  5/1997  United Kingdom.

*Primary Examiner*—David J. Bagnell
*Assistant Examiner*—Jong-Suk Lee
*Attorney, Agent, or Firm*—Ratner & Prestia

[57] ABSTRACT

An underwater pipeline apparatus for delivering a pig unit through an initially air or gas-containing sea-bed pipeline from an entry point toward an exit point. The apparatus includes an inlet conduit for coupling to a pipeline inlet port at a location behind the pig unit in its intended direction of travel, from the entry point to the exit point, having an opening to the sea to admit pressurised water into the pipeline under the head of water above the pipeline and means to regulate flow of water through the inlet conduit into a pipeline to regulate the speed of delivery of the pig unit along the pipeline.

29 Claims, 2 Drawing Sheets

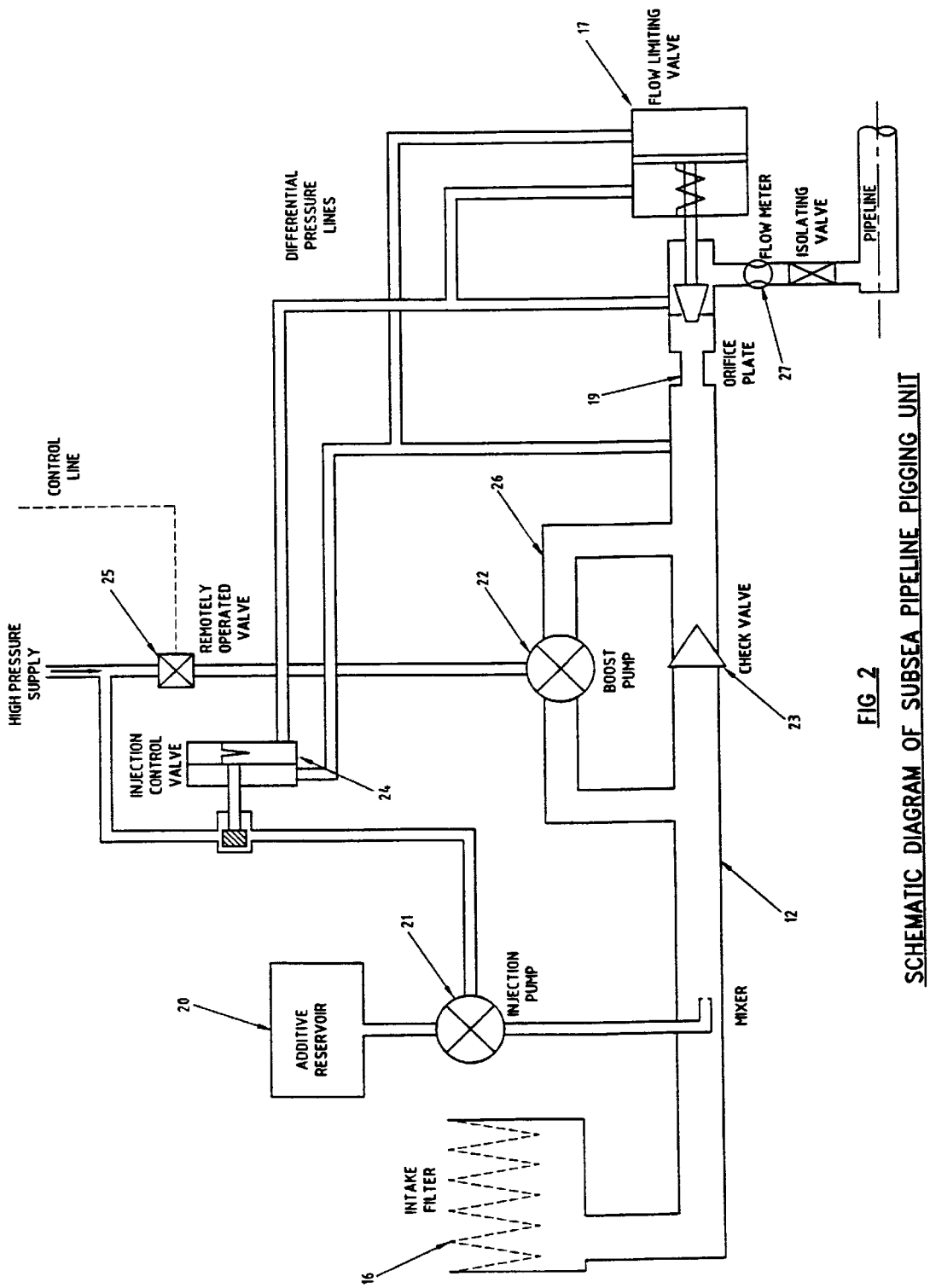

UNDERWATER PIPELINE APPARATUS FOR DELIVERING A PIG UNIT BY FLOODING OF THE PIPELINE

BACKGROUND OF THE INVENTION

This invention relates to underwater pipeline apparatus for delivering a pig unit through a sea-bed pipeline, or for the flooding of a sea-bed pipeline with seawater.

Conventionally, pigging of a pipeline is carried out by pumping liquid or gas into one end of the pipeline in order to drive a pig train through it. This normally requires a substantial flow of liquid or gas at relatively high pressure requiring a large pump of high horsepower located on a surface vessel or surface installation. This is expensive in terms of capital equipment, cost of mobilisation to site, and the consumption of fuel. An important cost factor, where the pipeline is laid in deep water, is the need for large-bore high-pressure pipework from surface to sea-bed.

In the case of sub-sea pipeline which is initially filled with air or low-pressure gas, there already exists a hydrostatic pressure difference between the interior of the pipe and the surrounding sea. This is sometimes used to flood a pipeline under natural pressure, by simply allowing water to enter, possibly via a strainer. Our invention is a device which allows this natural pressure difference to be utilized to assist the pigging process in a controlled manner, so achieving a substantial saving.

It is not sufficient to open a valve to admit water to drive a pig or pig train through the pipeline, because some or all of the following requirements must normally be met;

a) The water admitted to the pipeline must meet certain standards for contained impurities.

b) Chemicals may be required to be added to the water at a specified concentration, in order to protect the pipeline from corrosion or marine growth or to detect leaks during testing.

c) The pig train's position must be recorded, normally by measuring the quantity of water admitted.

d) The pig train must proceed at a speed within a specific range.

The last requirement imposes two particular problems in the context of what is proposed. Initially, the hydrostatic pressure difference is at its maximum and the pipeline could flood too rapidly if the rate were not controlled. Conversely, the head diminishes as the pipeline becomes progressively filled and will eventually fall to equal the driving pressure differential required for the pig or pig train; at this point, flooding will cease and action will be required to complete movement of the pig to the end of the pipeline.

SUMMARY OF THE INVENTION

According to a first aspect of the invention there is provided apparatus for delivering a pig or pig train through an initially air or gas containing sea-bed pipeline from an entry point to an exit point, comprising an inlet conduit for coupling to a pipeline inlet port at a location behind the pig unit in its intended direction or travel, from said entry point to said exit point, the inlet conduit having an opening to the sea to admit pressurised water in the pipeline under the head of water above the pipeline and means to regulate flow of water through the inlet conduit into the pipeline to regulate the speed of delivery of the pig unit along the pipeline.

According to a second aspect of the present invention there is provided underwater pipeline apparatus for flooding of sub-sea pipelines comprising an inlet conduit for coupling to a pipeline inlet port, the inlet port having an opening to the sea to admit pressurised water in the pipeline under the head of water above the pipeline and means to regulate flow of water through the inlet conduit into the pipeline to regulate the speed of flooding of the pipeline.

The apparatus is preferably incorporated in a sub-sea skid connected to the pipeline inlet to be used. The essential feature of the skid is a device for limiting or controlling the rate at which seawater enters the pipeline, so as to restrict the speed of the pig or pig train.

Preferably the inlet conduit is capable of being coupled underwater to the said pipeline inlet port by way of actions carried out by a diver or a remotely operated vehicle.

Preferably the inlet conduit contains a device for measuring or recording the flow of water entering the pipeline.

In any of the above arrangements the inlet conduit may include an isolating valve for closing of flow through the conduit, which valve may be operated manually or, where the application requires, may be operated remotely or by the action of a remotely operated vehicle.

Also in any of the above arrangements the means to regulate flow of water through the conduit may comprise a variable opening valve and means to adjust the opening of the valve to maintain a substantially constant flow rate of water into the pipeline.

In one particular arrangement according to the invention the means to adjust the valve opening may comprise a fixed orifice in the conduit upstream or downstream of the variable valve and means to control the opening/closing of the valve in response to variation in pressure across the orifice.

The inlet to the conduit may contain an intake filter to filter the water passing into the conduit to be admitted into the pipeline.

According to a further feature of the invention means may be provided for injecting additive material into the conduit.

More particularly the means for injecting the additive material(s) provide for variation of the rate of injection in approximate proportion to the rate of flow of water into the pipeline.

For example the means for injecting additive material(s) may comprise a reservoir or reservoirs supplying the material(s) and an injection control regulator comprising a valve or orifice whose opening is caused to increase or decrease as the rate of flow of water into the pipeline increases or decreases.

Alternatively, the means for injecting the additive material(s) comprises a reservoir or reservoirs supplying the material(s) and an injection pump of which the operating speed is caused to increase or decrease as the rate of flow of water into the pipeline increases or decreases.

In any of above arrangements a pump may be connected to the conduit for boosting flow through the conduit.

In the latter construction the inlet conduit may have a non-return valve and a bypass extending around the non-return valve may contain a pump for boosting the flow through the inlet conduit, the pump being connected to a supply of power from a source contained within the apparatus or supplied from the surface or from a remotely operated vehicle, when the flow into the pipeline requires to be boosted.

BRIEF DESCRIPTION OF THE DRAWINGS

The following is a description of some specific embodiments of the invention, reference being made to the accompanying drawings, in which:

FIG. 2 is a similar view of a further form of apparatus.

DESCRIPTION OF THE PREFERRED EMBODIMENTS

Figure 1:
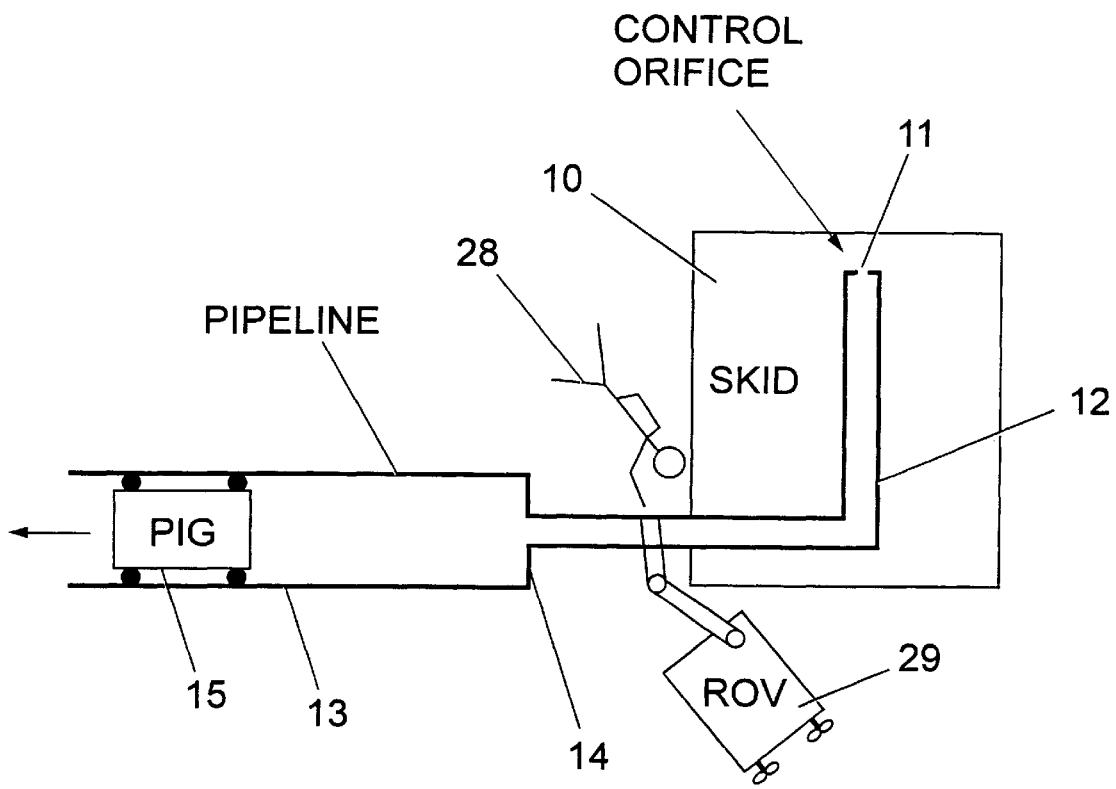
FIG. 1 is a diagrammatic view of one arrangement of underwater pipeline apparatus for delivering a pig unit through a sea-bed pipeline.

In its very simplest form, the skid 10 might contain no more than a fixed orifice 11 at the inlet end of a conduit 12 linked to the pipeline 13 at an entry point 14, as shown in FIG. 1. The skid could simply be lowered to the sea-bed with the end of the pipeline. The orifice limits the initial rate of flow to an acceptable maximum. The pipeline would then fill at a diminishing rate as the pig 15 proceeds, until in due course a diving-support vessel arrives to complete the necessary processes.

It will generally be appreciated that the pig need not be included in the above simplified example. The orifice 11 at the inlet end of the conduit would allow the pipeline 13 to be flooded with seawater as the skid 10 is lowered to the sea-bed.

In other circumstances it may be required to use such apparatus to drive a pig through a pipeline which has already been laid. The pipeline would require to have been fitted with an appropriate connection device as its inlet point. In such a case, the skid would be lowered to the seabed adjacent to the end of the existing pipeline, and a diver 28 or remotely operated vehicle 29 would connect a flexible hose from the skid to the inlet connection device on the pipeline to enable the operation.

A more sophisticated version of any of the previously mentioned skids could incorporate some or all of the following features as shown in FIG. 2.

An intake filter 16 capable of purifying sea water to the required standard, at the required rate of flow.

An isolating valve 24 opening of which initiates the process of flooding or delivering a pig through the pipeline. This valve may conveniently be operated remotely or by the intervention of a remotely operated vehicle.

A variable choke 17 which adjusts the flow of water into the pipeline in order to compensate, for as long as practicable, for the diminishing head as pigging proceeds. This choke is controlled automatically in response to the currently existing rate of flow, for example by means of a pressure operated device such as a diaphragm coupled to either side of an orifice plate 19 in the conduit.

A device 27 for recording the rate at which water is entering the pipe, and/or the total quantity which has passed (from which the position of the pig may be calculated). The rate of flow will also help to calculate when the pipeline is full and to control the maximum intake rate of water. This might, for example, take the form of a water-driven turbine geared to a dial, which if necessary can be read by means of an underwater camera carried by a remotely operated vehicle. Alternatively, the device 27 might send electrical signals representing flow to a recording instrument at the surface.

An injection device 21 drawing from reservoir(s) 20 of additive chemicals, at a rate which may also be controlled to be at least approximately proportional to the water flow rate. This device 21 could, for example, be a pump mechanically driven from the turbine mentioned previously, or a system of fixed or variable orifices which control the flow according to the prevailing hydrostatic pressure or to a pressure varying with the water flow rate, as may be derived from orifice plate 19 in the main flow.

A facility for providing a supply of pressurised water, in order to drive the pig over the final stage of the operation. This might consist simply of a connection point for the supply of a flow of water (possibly containing additive chemicals) from the surface, when a support vessel arrives to complete the task.

Alternatively, a power supply from the surface or from a remotely operated vehicle might be used to drive a boost pump 22 located in a bypass 26. The power supply to this pump could be electrical, pneumatic, hydraulic oil or a relatively low flow of high-pressure water to generate a relatively large flow at the lower pressure required in the pipeline. Check or non-return valves 23 will ensure that the boost flow is correctly directed.

When a boost pump is used in this manner, additive chemicals may continue to be drawn from reservoir(s) 20 via the injection device 21. If the injection device 21 is a pump, further pumping of additive chemicals may be accomplished by driving the pump from a power supply similar to that proposed for boost pump 22. The speed of operation of the injection pump could be regulated in approximate proportion to the rate of water flow by a suitable control valve 25.

The advantages of the self-contained sub-sea skid are:

- saving on the cost of pumping equipment, mobilization and fuel, as already mentioned
- as the unit is self-contained, it can be left to conduct the main part of the pigging process while the support vessel does other work, so reducing the cost of vessel charter
- in deep water, avoiding the cost and technical difficulties of connecting large bore, high pressure hoses or tubing from surface to sea-bed

I claim:

1. An underwater pipeline apparatus for delivering a pig unit through an initially gas-containing pipeline from an entry point toward an exit point, the apparatus comprising an inlet conduit for coupling to a pipeline inlet port at a location behind the pig unit with respect to the direction of travel of the pig unit from said entry point to said exit point, the inlet conduit having an opening to admit pressurized water into the pipeline under the head of water above the pipeline, and means to regulate flow of water through the inlet conduit to regulate the speed of delivery of the pig unit along the pipeline.

2. The underwater pipeline apparatus as claimed in claim 1, wherein the inlet conduit is adapted to be coupled underwater to the pipeline inlet port by a diver or remotely operated vehicle.

3. The underwater pipeline apparatus as claimed in claim 1, wherein the inlet conduit contains a device for measuring or recording the flow of water entering the pipeline.

4. The underwater pipeline apparatus as claimed in claim 1, wherein the inlet conduit includes an isolating valve for closing off flow through the inlet conduit.

5. The underwater pipeline apparatus as claimed in claim 4, wherein the isolating valve is operated manually.

6. The underwater pipeline apparatus as claimed in claim 4, wherein the isolating valve is operated remotely.

7. The underwater pipeline apparatus as claimed in claim 4, wherein the isolating valve is operated by a remotely operated vehicle.

8. The underwater pipeline apparatus as claimed in claim 1, wherein the means to regulate flow of water through the inlet conduit comprise a variable opening valve and means to adjust the opening of the valve to maintain a substantially constant flow rate of water into the pipeline.

9. The underwater pipeline apparatus as claimed in claim 8, wherein the means to adjust the opening of the valve comprise a fixed orifice in the inlet conduit spaced from the variable opening valve and means to control actuation of the valve in response to variation in pressure across the fixed orifice.

10. The underwater pipeline apparatus as claimed in claim 1, wherein the inlet conduit contains an intake filter to filter the water passing into the inlet conduit.

11. The underwater pipeline apparatus as claimed in claim 1, wherein means are provided for injecting an additive material into the inlet conduit.

12. The underwater pipeline apparatus as claimed in claim 11, wherein the means for injecting the additive material provides for variation of the rate of injection in approximate proportion to the rate of flow of water into the pipeline.

13. The underwater pipeline apparatus as claimed in claim 12, wherein the means for injecting the additive material comprises a reservoir supplying the additive material and an injection control regulator comprising an orifice wherein opening of the orifice is variable as the rate of flow of water into the pipeline varies.

14. The underwater pipeline apparatus as claimed in claim 12, wherein the means for injecting the additive material comprises a reservoir supplying the additive material and an injection pump wherein the operating speed of the pump is variable as the rate of flow of water into the pipeline varies.

15. The underwater pipeline apparatus as claimed in claim 1, wherein a pump is connected to the inlet conduit for boosting flow through the inlet conduit.

16. The underwater pipeline apparatus as claimed in claim 1, wherein the inlet conduit includes a non-return valve and a bypass, the bypass extending around the non-return valve and including a pump for boosting the flow through the inlet conduit.

17. An underwater pipeline apparatus for flooding of sub-sea pipelines comprising an inlet conduit for coupling to a pipeline inlet port, the inlet conduit having an opening to admit pressurized water into the pipeline under the head of water above the pipeline, and means to regulate flow of water through the inlet conduit to regulate the speed of flooding of the pipeline.

18. The underwater pipeline apparatus as claimed in claim 17, wherein the inlet conduit is adapted to be coupled underwater to the pipeline inlet port by a diver or remotely operated vehicle.

19. The underwater pipeline apparatus as claimed in claim 17, wherein the inlet conduit includes a device for measuring or recording the flow of water entering the pipeline.

20. The underwater pipeline apparatus as claimed in claim 17, wherein the inlet conduit includes an isolating valve for closing off flow through the inlet conduit.

21. The underwater pipeline apparatus as claimed in claim 17, wherein the means to regulate flow of water through the inlet conduit comprises a variable opening valve, and means to adjust the opening of the valve to maintain a substantially constant flow rate of water.

22. The underwater pipeline apparatus as claimed in claim 21, wherein the means to adjust the opening of the valve comprises a fixed orifice in the inlet conduit spaced from the variable opening valve and means to control actuation of the valve in response to variation in pressure across the fixed orifice.

23. The underwater pipeline apparatus as claimed in claim 17, wherein the inlet conduit includes an intake filter to filter the water passing into the inlet conduit.

24. The underwater pipeline apparatus as claimed in claim 17, wherein means are provided for injecting an additive material into the inlet conduit.

25. The underwater pipeline apparatus as claimed in claim 24, wherein the means for injecting the additive material provides for variation of the rate of injection in approximate proportion to the rate of flow of water into the pipeline.

26. The underwater pipeline apparatus as claimed in claim 24, wherein the means for injecting the additive material comprises a reservoir supplying the additive material and an injection control regulator comprising an orifice wherein opening of the orifice is variable as the rate of flow of water into the pipeline varies.

27. The underwater pipeline apparatus as claimed in claim 24, wherein the means for injecting the additive material comprises a reservoir supplying the additive material and an injection pump wherein the operating speed of the pump is variable as the rate of flow of water into the pipeline varies.

28. The underwater pipeline apparatus as claimed in claim 17, wherein a pump is connected to the inlet conduit for boosting flow through the inlet conduit.

29. The underwater pipeline apparatus as claimed in claim 17, wherein the inlet conduit includes a non-return valve and a bypass, the bypass extending around the non-return valve and including a pump for boosting the flow through the inlet conduit.

* * * * *